United States Patent [19]
Valyi

[11] Patent Number: 5,871,611
[45] Date of Patent: Feb. 16, 1999

[54] SYSTEM FOR PRODUCING A PARTITIONED BOTTLE

[75] Inventor: Emery I Valyi, Katonah, N.Y.

[73] Assignee: PepsiCo, Inc., Purchase, N.Y.

[21] Appl. No.: 843,096

[22] Filed: Apr. 25, 1997

Related U.S. Application Data

[62] Division of Ser. No. 651,254, May 23, 1996.

[51] Int. Cl.⁶ .......................... B29C 49/00; B29C 49/20
[52] U.S. Cl. .......................... 156/382; 156/423; 156/500; 425/503
[58] Field of Search .................... 156/242, 244.14, 156/244.15, 245, 292, 293, 294, 382, 423, 500; 215/6, 372; 220/501, 553; 264/512, 513, 514, 515, 516; 425/503, 500

[56] References Cited

U.S. PATENT DOCUMENTS

| | | | |
|---|---|---|---|
| 3,160,542 | 12/1964 | Foxe | 156/69 |
| 4,065,536 | 12/1977 | Lucas | 264/98 |
| 4,212,910 | 7/1980 | Taylor et al. | 156/334 |
| 4,277,000 | 7/1981 | Jaarsma | 215/6 |
| 4,729,864 | 3/1988 | Chang et al. | 156/245 |
| 5,104,472 | 4/1992 | Kasugai et al. | 156/245 |
| 5,135,823 | 8/1992 | Eales | 215/6 |
| 5,232,108 | 8/1993 | Nakamura | 215/6 |
| 5,242,066 | 9/1993 | Kelsey | 215/6 |
| 5,338,503 | 8/1994 | Yanagisawa et al. | 264/516 |
| 5,388,719 | 2/1995 | Takasugi et al. | 220/553 |
| 5,398,828 | 3/1995 | Valyi | 215/6 |
| 5,462,278 | 10/1995 | Valyi | 273/138 R |
| 5,588,550 | 12/1996 | Meyer | 215/6 |

FOREIGN PATENT DOCUMENTS

| | | | |
|---|---|---|---|
| 56-28831 | 3/1981 | Japan | 264/514 |
| 116369 | 6/1918 | United Kingdom | 215/6 |

*Primary Examiner*—Steven D. Maki
*Attorney, Agent, or Firm*—Bachman & LaPointe, P.C.

[57] ABSTRACT

A method for producing a partitioned container of the present invention includes the steps of providing a preform having an interior surface; separately forming an inner wall for insertion into the preform; inserting the inner wall into the preform; preparing for molding and molding the preform and inner wall into the partitioned container; and activating a manner for securing the inner wall to the interior surface of the preform during the step of preparing. A system for forming a partitioned container in accordance with the present invention includes a preform including an interior surface surrounding a cavity; an inner wall formed separately from the preform, the inner wall including a manner for securing to the preform upon the application of heat thereto, and a molding device for molding the preform into the container. During preparation for molding of the preform into the container, the preform and inner wall are heated and the manner for securing is activated, thereby securing the inner wall to the interior surface.

5 Claims, 2 Drawing Sheets

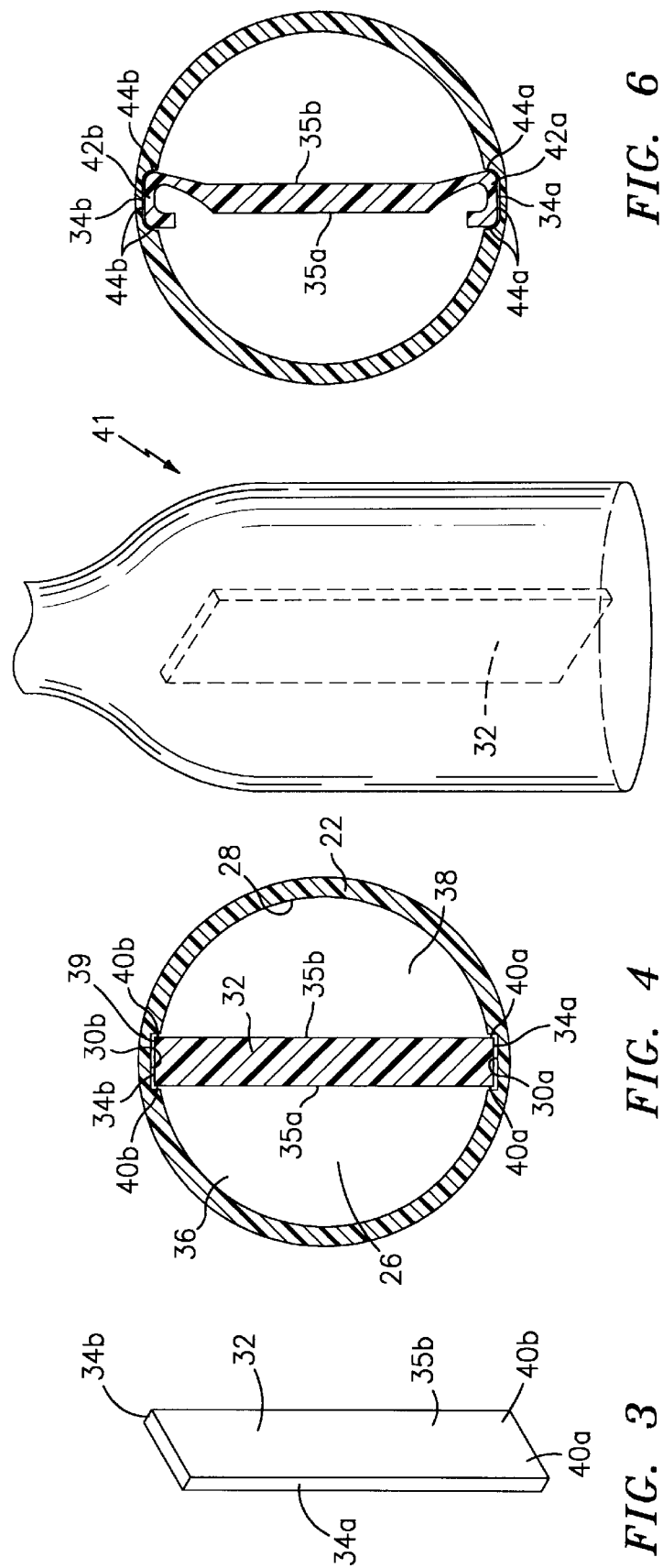

SYSTEM FOR PRODUCING A PARTITIONED BOTTLE

This is a Division of application Ser. No. 08/651,254, filed May 23, 1996.

BACKGROUND OF THE INVENTION

This invention is directed to a process for molding containers, and more particularly, to an improved process for molding partitioned containers from a preform and a separately formed inner wall, wherein the inner wall is secured to the preform prior to molding the container.

Partitioned containers and methods for making the same are well known in the art. In most cases, a preform is used to form the partitioned container, which preform has integrally formed therewith the required partitions or walls and the like for forming the partitions of the finished container. That is, typically a complex mold is required to injection mold or otherwise form a preform having integral partitions extending across the cavity thereof. Alternatively, a simple preform may be formed having a hollow cavity and a separately formed partition subsequently secured therein. In these cases, securing the partition to the inside surface of the preform is problematic in that the partition must be caused to maintain its engagement with the inside surface of the preform during subsequent blow molding operations for forming the container. In addition to withstanding expansion during molding and its securement with the inner surface of the preform, the partition must also reliably maintain its engagement with the inner wall of the container after the container is formed. Still another method of forming a partitioned container is to injection mold the entire container of one construction including the partitions. Typically, multiple fairly large and complex injection molds are required for this method.

The prior art includes a plurality of partitioned containers, none of which cure the problems in forming partitioned containers, as set forth above.

U.S. Pat. No. 5,398,828 to Valyi discloses a blow molded plastic container including an internal support and handgrips. The blow molded container includes at least one internal supporting member integral with the inside wall of the body portion to support the same. The body portion defines lobes connected together by depressions which define a handgrip. The depressions are supported by the internal supporting member. The internal supporting member is formed integral with the preform during molding thereof and is then blow molded into the internal member of the container.

U.S. Pat. No. 5,135,823 to Eales discloses a modular multi-compartmented blow molded container. The container includes partition members for forming the compartments therein which initially form portions of a mold for the container. When molding is complete, the partition members form part of the container, with the molded plastic material of the container substantially surrounding the partition members. In another embodiment, the containers are modular, wherein mating engagement members are formed in facing walls of separate container portions that are joined subsequent to molding. The container portions can be made detachable or permanently attached. Accordingly, in this container, the partitions are provided during molding of the container, wherein the partitions are a part of the mold which are adapted to become a part of the container.

U.S. Pat. No. 5,232,108 to Nakamura discloses a preform having an inner partition wall and a process for making a plastic vessel therefrom having an inner partition wall. The preform has an internal partition wall formed to extend across the interior of the barrel portion of the preform and up from the bottom portion thereof. The internal partition wall is injection molded along with the remaining portion of the preform during the formation thereof. The same wall is later blow molded into the partition for the container.

U.S. Pat. No. 4,277,000 to Jaarsma discloses multi-compartmented containers. The multi-compartmented containers include a molded body and a molded cap secured thereto. The body includes a confining wall forming a space, an internal dividing wall forming separate compartments within the space and a base. A fluid seal is formed by the confining wall and the inside surface of the body of the container. The entire container is formed from injection molding, including the formation of the dividing wall.

U.S. Pat. No. 4,065,536 to Lucus discloses a method of making a precisely partitioned bulbous-shape container. The container is formed from a preform having a partition integrally formed therein during the formation of the preform. Accordingly, the partition is integral to the remaining body portion of the preform.

PCT Application GB89/01362 discloses a partitioned plastic container. The container is formed from an injection molded preform, wherein the preform has an integrally formed partition therein which is also formed during the injection molding process. The preform and partition are later blown into the shape of a container having a partition therein.

There exists a need, therefore, for an improved process for forming a partitioned container which process allows for the use of a simple preform and provides a reliable manner for attaching a separately formed partition thereto and to sustain the attachment during formation of the container to be formed thereby and to the container after formation.

SUMMARY OF THE INVENTION

The primary object of this invention is to provide an improved method for forming partitioned containers.

Another object of this invention is to provide a method for forming partitioned containers, wherein the partitioned container is formed from a preform which includes a separately formed inner wall reliably secured therein.

Still another object of this invention is to provide an improved method for forming a partitioned container, which container is formed from a preform including a separately formed inner wall and which inner wall is securely bonded to the interior surfaces of the preform and container via a heat activated adhesive which is activated before and/or during the molding preparation and molding of the preform.

The foregoing objects and following advantages are achieved by the method for producing a partitioned container of the present invention which comprises the steps of providing a preform having an interior surface; separately forming an inner wall for insertion into the preform; inserting the inner wall into the preform; preparing for molding and molding the preform and inner wall into the partitioned container; and activating a manner for securing the inner wall to the interior surface of the preform during the step of preparing.

The objects and advantages are also achieved by a system for forming a partitioned container in accordance with the present invention which comprises a preform including an interior surface defining a cavity; an inner wall formed separately from the preform, the inner wall including means for securing to the preform upon the application of heat thereto, and means for molding the preform into the container. During preparation for molding into the container via the means for molding, the preform and inner wall are heated and the means for securing is activated, thereby securing the inner wall to the interior surface.

The details of the present invention are set out in the following description and drawings wherein like reference characters depict like elements.

BRIEF DESCRIPTION OF THE DRAWINGS

FIG. 3 is a perspective view of an inner wall used in the preform shown in FIG. 2 for the method of FIG. 1;

FIG. 4 is an enlarged cross-sectional view taken along line 4—4 in FIG. 2;

FIG. 5 is a perspective view of an example of a container formed in accordance with the method of the present invention; and FIG. 6 is a cross-sectional view similar to that shown in FIG. 4 but disclosing an alternative embodiment.

DETAILED DESCRIPTION OF THE PREFERRED EMBODIMENT

Figure 1:
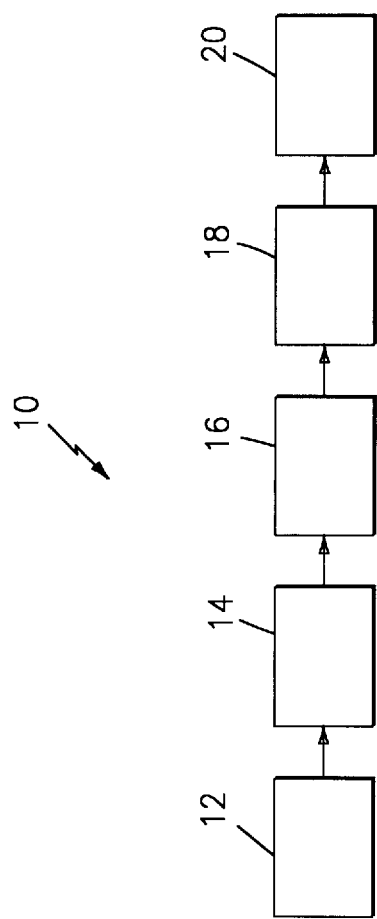
FIG. 1 is a schematic view of a process for forming a partitioned container in accordance with the principles of the present invention.

Referring now to the drawings in detail, there is shown in FIG. 1 a schematic view of a process for forming a compartmented container, which process is designated generally as 10. The process generally includes step 12, molding or providing a preform; step 14, separately forming an inner wall for insertion into the preform; step 16, inserting the inner wall into the cavity of the preform; step 18, preparing the preform for molding and activating a manner for securing the inner wall to the interior surface of the preform; and step 20, molding the preform and inner wall into a partitioned container. These process steps are discussed in further detail below.

Figure 2:
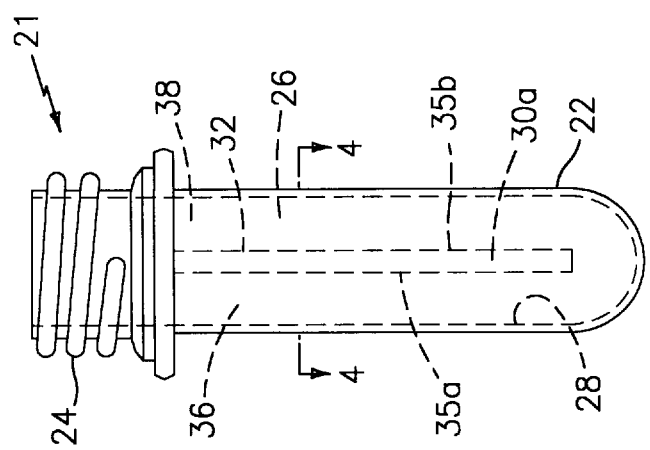
FIG. 2 is an elevational view of a preform used in accordance with the principles of the present invention in the method shown in FIG. 1.

In step 12, and referring to FIG. 2, a preform 21 is formed in accordance with known methods, i.e. preferably injection molded to have a well known shape including a body portion 22 and a threaded and/or flange portion 24, which portions 22 and 24 define a cavity 26 surrounded by an interior surface 28. As shown in both FIGS. 2 and 4, interior surface 28 is formed with slots 30a and 30b extending longitudinally therein for receiving inner wall 32.

In step 14, and referring to FIGS. 3 and 4, inner wall 32 is formed separately from preform 21 in a size to fit into cavity 26 of preform 21. Preferably inner wall 32 is longitudinal and rectangular in shape having contact edges 34a and 34b for insertion into slots 30a and 30b, respectively, and includes faces 35a and 35b. As shown in FIGS. 2–4, inner wall 32 is sized to fit into cavity 26 of preform 21, and extend across cavity 26, thereby forming two compartments 36 and 38.

In step 16, inner wall 32 is inserted into cavity 26 of preform 21, in slots 30a and 30b, as shown in FIG. 4.

In step 18, preform 21 is prepared for blow molding by heating and accordingly, inner wall 32 is secured to the interior surface 28 of preform 21 in slots 30. This step is preferably accomplished by using a heating element (not shown) and a heat activated adhesive 39 which is coated onto inner wall 32, as shown in FIG. 4, preferably on edges 34a and 34b and preferably on at least a portion of faces 35a and 35b in the areas 40a and 40b, immediately adjacent edges 34a and 34b. Adhesive 39 may also extend over the entirety of faces 35a and 35b.

Therefore, as the preform is heated for blow molding in step 18, adhesive 39 is activated and thereby secures inner wall 32 at edges 34a and 34b and longitudinal areas 40a and 40b to the walls of slots 30a and 30b formed in preform 21. Once the inner wall is securely held to the interior surface 28 of preform 21, the actual step of blow molding, step 20, is performed, thereby stretching the inner wall 32 across the entire diameter of the container being formed.

Accordingly, adhesive 39 is adapted to have a temperature activation range which is effectively activated in the blow molding preparation temperature range. By activation, the adhesives may become tacky, melted, or chemically activated to cause adherence to interior surface 28 of preform 21. A number of adhesives having these properties are known in the art and accordingly, any such adhesives may be used with success, and the particular one chosen may be dictated by the preparation requirements of the molding material chosen. For some adhesives completed activation and reliable adherence may occur during the actual molding step.

In step 20, preform 21 is molded into partitioned container 41, shown in FIG. 5, preferably using a blow molding technique well known in the art. During blow molding or the like and in the scenario where PET (Polyethylene Terephthalate) is used, the temperature reached for molding is typically 95°–110° C., in which range, the chosen adhesive 39 is preferably activated.

Accordingly, container 41 shown in FIG. 5 is thereby formed having an inner wall reliably secured therein. Preferably, although not required, the inner wall is of a length such that it does not extend the entire length of the body portion of container 41, as shown, allowing for fluid flow underneath the inner wall. Alternatively, if desired, the inner wall may extend the entire length of the container from the base to the neck to form separate, self-contained compartments. The inner wall may be used, for example, for playing games or for displaying things such as advertisements and the like, or for supporting an integral handgrip, or for forming separate compartments.

Referring again to step 18 and now FIG. 6, an alternative embodiment of inner wall 32 for increasing the strength of the bond between inner wall 32 and interior surface 28 of preform 21, is shown. In this embodiment, the ends of inner wall 32 are formed into hook-like members 42a and 42b, the outer surfaces of which include edges 34a and 34b. By forming the longitudinally extending ends of inner wall 32 into hook-like members 42a and 42b, increased surface areas 44a and 44b, defined by the outer surface of the hook-like members and including edges 34a and 34b, are obtained for improved securement to the surfaces of slots 30a and 30b. In this embodiment, adhesive 39 is preferably spread over the entire outer surfaces 44a and 44b of the hook-like members 42a and 42b and the hook-like members 42a and 42b are preferably of a size to snugly fit into slots 30a and 30b, respectively. Accordingly, when adhesive 39 is activated during heating during blow molding preparation and/or during molding, the entirety of outer surfaces 44a and 44b of hook-like members 42a and 42b are caused to adhere to the surfaces of slots 30a and 30b, respectively, thereby obtaining a stronger connection between inner wall 32 and interior surface 28 of preform 21.

While an inner wall has been shown herein having only two faces for forming only two compartments, it is to be understood that variously shaped inner walls, such as those having more than two faces, may be used so as to form any number of compartments in container 41. That is, an inner wall having a cross-section resembling the interior of a peace sign or a plus sign may also be used with the method described herein for forming containers having three or four compartments, respectively. A variety of other shapes for forming even more compartments may also be used. For these embodiments, the same slot and adhesive arrangements may be used for achieving a secure bond between the inner wall and the preform and the inner wall and the container.

The primary advantage of this invention is that an improved method is provided for forming partitioned containers. Another advantage of this invention is that a method is provided for forming partitioned containers, wherein the partitioned container is formed from a preform which includes a separately formed inner wall reliably secured therein. Still another advantage of this invention is that an improved method is provided for forming a partitioned container, which container is formed from a preform including a separately formed inner wall and which inner wall is securely bonded to the interior surfaces of the preform and container via a heat activated adhesive which is activated before and/or during the molding of the preform into the container.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A system for forming a partitioned container, comprising:

a preform including an interior surface surrounding a cavity;

an inner wall inserted in said preform and formed separately from said preform, said inner wall having contact edges for engagement with said interior surface wherein said interior surface includes slots for engagement with said contact edges, means for securing said contact edges to said interior surface provided between said contact edges and interior surface;

means for blow molding said preform including said inner wall into said container including stretching the inner wall across an inside diameter of the container;

wherein during preparation for molding of said preform into said container via said means for blow molding, said preform and inner wall are heated using a heating means and said means for securing is activated, thereby securing said inner wall to said interior surface.

2. The system according to claim 1, wherein said edges are curled for forming larger surfaces for contact with said slots.

3. The system according to claim 1, wherein said means for securing comprises a heat activated adhesive.

4. The system according to claim 1, wherein said preform is formed from polyethylene terephthalate and said means for securing comprises a heat activated adhesive adapted to become activated upon heating said preform and inner wall using said heating means.

5. The system according to claim 1, wherein said inner wall extends longitudinally in said interior surface.

\* \* \* \* \*